(12) United States Patent
Freese (10) Patent No.: US 7,862,189 B1
(45) Date of Patent: Jan. 4, 2011

(54) ADJUSTABLE MIRROR ATTACHMENT

(75) Inventor: Lawrence O. Freese, Santa Rosa Beach, FL (US)

(73) Assignee: BRICA, Inc., Freeport, FL (US)

(*) Notice: Subject to any disclaimer, the term of this patent is extended or adjusted under 35 U.S.C. 154(b) by 0 days.

(21) Appl. No.: 12/732,812

(22) Filed: Mar. 26, 2010

Related U.S. Application Data (60) Provisional application No. 61/164,939, filed on Mar. 31, 2009.

(51) Int. Cl.
  *G02B 7/182* (2006.01)
  *B60R 1/04* (2006.01)

(52) U.S. Cl. ................. 359/872; 359/876; 248/479; 248/481; 248/483; 248/485

(58) Field of Classification Search ............. 359/872, 359/876, 877; 248/478, 479, 481, 483, 485
See application file for complete search history.

(56) References Cited

U.S. PATENT DOCUMENTS

| | | | | |
|---|---|---|---|---|
| 1,446,164 A | * | 2/1923 | Eyraud | 403/123 |
| 1,749,868 A | * | 3/1930 | Anderson | 248/483 |
| 2,629,286 A | * | 2/1953 | Budreck | 248/483 |
| 4,401,289 A | * | 8/1983 | Fisher et al. | 248/483 |
| 4,624,539 A | | 11/1986 | King et al. | |
| 4,702,572 A | | 10/1987 | Cossey | |
| 4,902,118 A | * | 2/1990 | Harris | 359/871 |
| 4,981,279 A | * | 1/1991 | Andreas et al. | 248/483 |
| 5,103,347 A | * | 4/1992 | Lumbra et al. | 359/871 |
| 5,363,246 A | * | 11/1994 | Perry et al. | 359/874 |
| 5,629,810 A | * | 5/1997 | Perry et al. | 359/872 |
| 6,354,708 B1 | | 3/2002 | Monahan et al. | |
| 6,478,435 B2 | | 11/2002 | Monahan et al. | |
| 6,491,403 B2 | | 12/2002 | Edgar | |
| 6,585,384 B2 | * | 7/2003 | Nielsen et al. | 359/877 |
| 6,715,377 B1 | * | 4/2004 | Brouwer | 74/431 |
| 6,857,753 B2 | | 2/2005 | Kane | |
| 6,913,364 B2 | | 7/2005 | Kane | |
| 7,097,314 B1 | | 8/2006 | Darling | |
| 2004/0190167 A1 | * | 9/2004 | Berger | 359/879 |

* cited by examiner

*Primary Examiner*—Ricky D Shafer
(74) *Attorney, Agent, or Firm*—Carter, Schnedler & Warnock, P.A.

(57) ABSTRACT

A mirror device for observing an infant in a rear-facing child safety car seat secured to the rear seat of a vehicle including a front seating area, a rear seating area, and a rear seat within the rear seating area, the rear seat having an upwardly-extending headrest. The mirror device includes a mirror and backing assembly having a rear surface, and an attachment connected to the rear surface for attaching the mirror device to the headrest. The attachment in turn includes a swivel device having a concavity element including a first bowl-like structure having a concave working surface; and a corresponding convexity element including a second bowl-like structure having a convex working surface configured to engage the concave working surface. The concavity and convexity elements are frictionally maintained in a desired adjusted position with reference to each other, while at the same time permitting manual adjustment.

8 Claims, 11 Drawing Sheets

ADJUSTABLE MIRROR ATTACHMENT

CROSS-REFERENCE TO RELATED APPLICATION

The benefit of U.S. provisional patent application Ser. No. 61/164,939, filed Mar. 31, 2009, is claimed.

BACKGROUND OF THE INVENTION

This invention relates to mirrors for observing an infant in a rear-facing child safety car seat secured to the rear seat of a vehicle. Examples are disclosed in Kane U.S. Pat. Nos. 6,857,753 and 6,913,364, and in Darling U.S. Pat. No. 7,097,314, the entire disclosures of which are hereby expressly incorporated by reference.

Very briefly, such mirrors are mounted near the top of a rear seat of a motor vehicle in such a way that the driver of the vehicle, by looking in the conventional rearview mirror, can observe in the mirror mounted near the top of the rear seat an infant in a child safety car seat of the type in which the infant is positioned facing the rear of the vehicle. A variety of attachment methods for such mirror devices have been proposed and employed.

SUMMARY OF THE INVENTION

In one aspect, a mirror device is provided for use inside a vehicle including a front seating area, a rear seating area, and a rear seat within the rear seating area, the rear seat having an upwardly-extending headrest. The mirror device includes a mirror and backing assembly having a rear surface, and an attachment connected to the rear surface for attaching the mirror device to the headrest. The attachment in turn includes a swivel device. The swivel device includes a concavity element including a first bowl-like structure having a concave working surface, and a concavity element opposite surface separated from the concave working surface by a concavity element bowl thickness; and a corresponding convexity element including a second bowl-like structure having a convex working surface configured to and at least partially frictionally engaging the concave working surface, and a convexity element opposite surface separated from the convex working surface by a convexity element bowl thickness. The first and second bowl-like structures have respective slotted apertures oriented at an angle with reference to each other. A biasing fastener extends through the slotted apertures to secure the concavity and convexity elements to each other and to bias the concave and convex working surfaces towards each other with sufficient force such that the concavity and convexity elements are frictionally maintained in a desired adjusted position with reference to each other, while at the same time permitting manual adjustment. One of the concavity and convexity elements being connected to the rear surface of the mirror and backing assembly, and the other of the concavity and convexity elements includes a sub-attachment for connection to the headrest.

In another aspect, a mirror device is provided for use inside a vehicle. The mirror device includes a mirror and backing assembly having a rear surface, and an attachment connected to the rear surface for attaching the mirror device to a portion of the vehicle. The attachment in turn includes a swivel device. The swivel device includes a concavity element including a first bowl-like structure having a concave working surface, and a concavity element opposite surface separated from the concave working surface by a concavity element bowl thickness; and a corresponding convexity element including a second bowl-like structure having a convex working surface configured to and at least partially frictionally engaging the concave working surface, and a convexity element opposite surface separated from the convex working surface by a convexity element bowl thickness. The first and second bowl-like structures have respective slotted apertures oriented at an angle with reference to each other. A biasing fastener extends through the slotted apertures to secure the concavity and convexity elements to each other and to bias the concave and convex working surfaces towards each other with sufficient force such that the concavity and convexity elements are frictionally maintained in a desired adjusted position with reference to each other, while at the same time permitting manual adjustment. One of the concavity and convexity elements being connected to the rear surface of the mirror and backing assembly, and the other of the concavity and convexity elements includes a sub-attachment for connection to the headrest.

DETAILED DESCRIPTION

Figure 1:
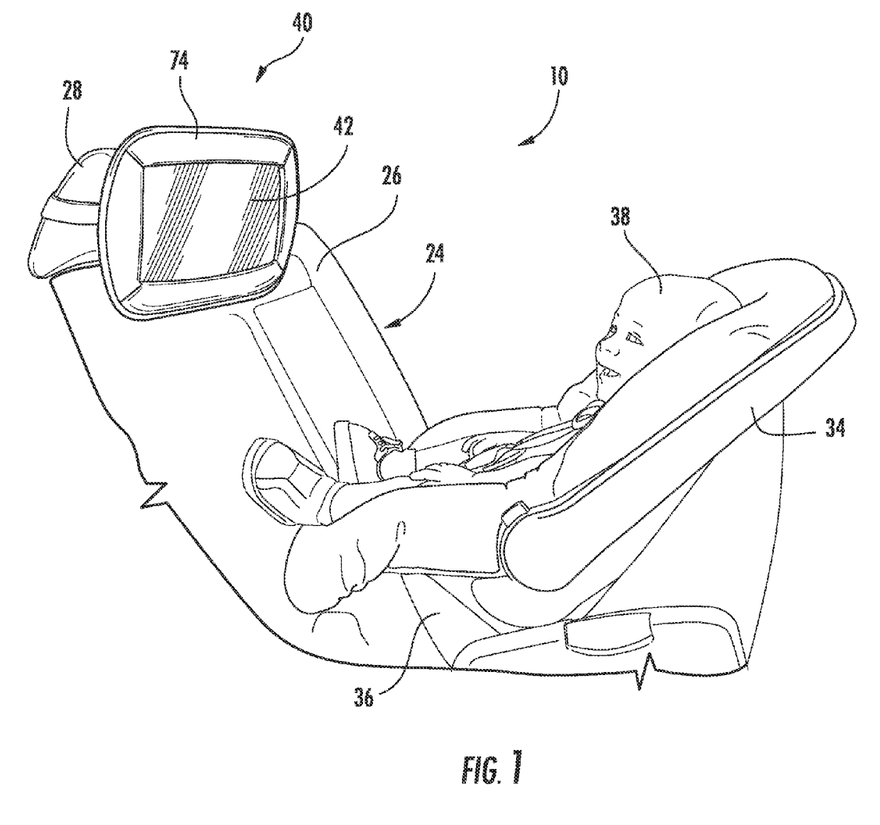
FIG. 1 illustrates a vehicle including a mirror device embodying the invention for observing an infant in a rear-facing child safety car seat secured to a headrest of the rear seat of the vehicle.

Referring first to FIG. 1, represented is a vehicle 10 in the form of a automobile 10 including a front vehicle seat (not shown) and a rearwardly-positioned vehicle seat 24. In FIG. 1, the rear seat 24 is the rear vehicle seat, since there are only front and rear seats and no intermediate seats in the particular vehicle 10 of FIG. 1. The rear seat 24 has a seat back 26 and a headrest 28 extending upwardly therefrom.

On and secured to the rear vehicle seat 24 is a rear-facing child safety car seat 34 secured by a seatbelt assembly 36 in a conventional manner. An infant 38 is seated in the child safety car seat 34.

In the front vehicle seat (not shown) is a driver (not shown) who may wish to observe the infant 38. A conventional rear-view mirror (not shown) is attached to the vehicle front windshield (not shown), but this rearview mirror alone is not sufficient for observing the infant 38, since the infant 38 is facing the rear.

A mirror device embodying the invention is generally designated 40. The mirror device 40 is attached to the headrest 28 in the manner described hereinbelow, and includes a front reflective surface 42 that enables observation of the infant 38 in the rear-facing child safety car seat 34 in a conventional manner, as disclosed in the above-incorporated U.S. Pat. Nos. 6,857,753; 6,913,364; and 7,097,314.

Referring now to FIGS. 2-11, in addition to FIG. 1, the mirror device 40 more particularly includes a mirror and backing assembly, generally designated 44, which includes a mirror 46 defining the front reflective surface 42, as well as a mirror frame 48 having a rear surface 50 serving as a rear surface 50 of the mirror and backing assembly 44. The mirror 46 is conventional, and for example is made of injection molded plastic with a reflective layer to provide the front reflective surface 42, which is slightly convex. The mirror frame 48 has a central aperture 52 surrounded by an integral collar 54 to provide rigidity.

Figure 2:
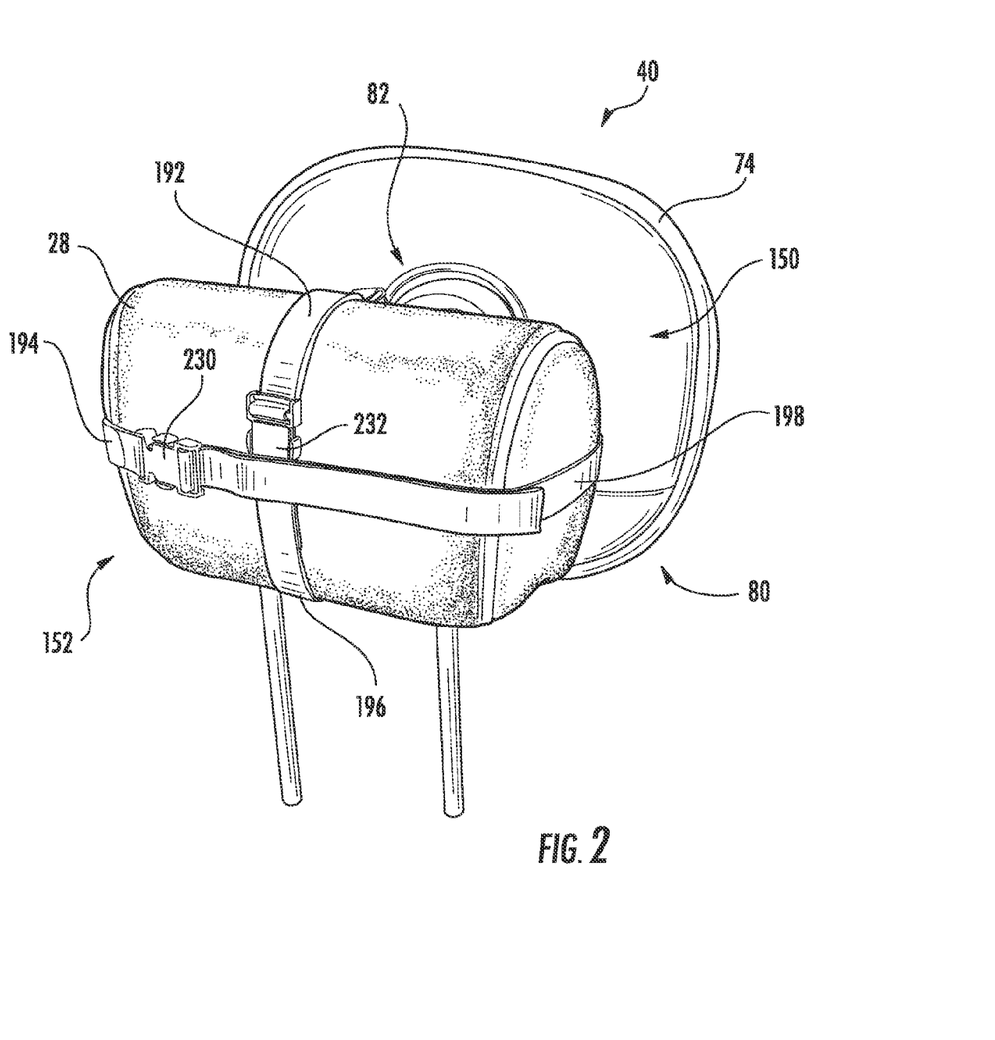
FIG. 2 is a rear view illustrating the mirror device secured to the headrest.
Figure 3:
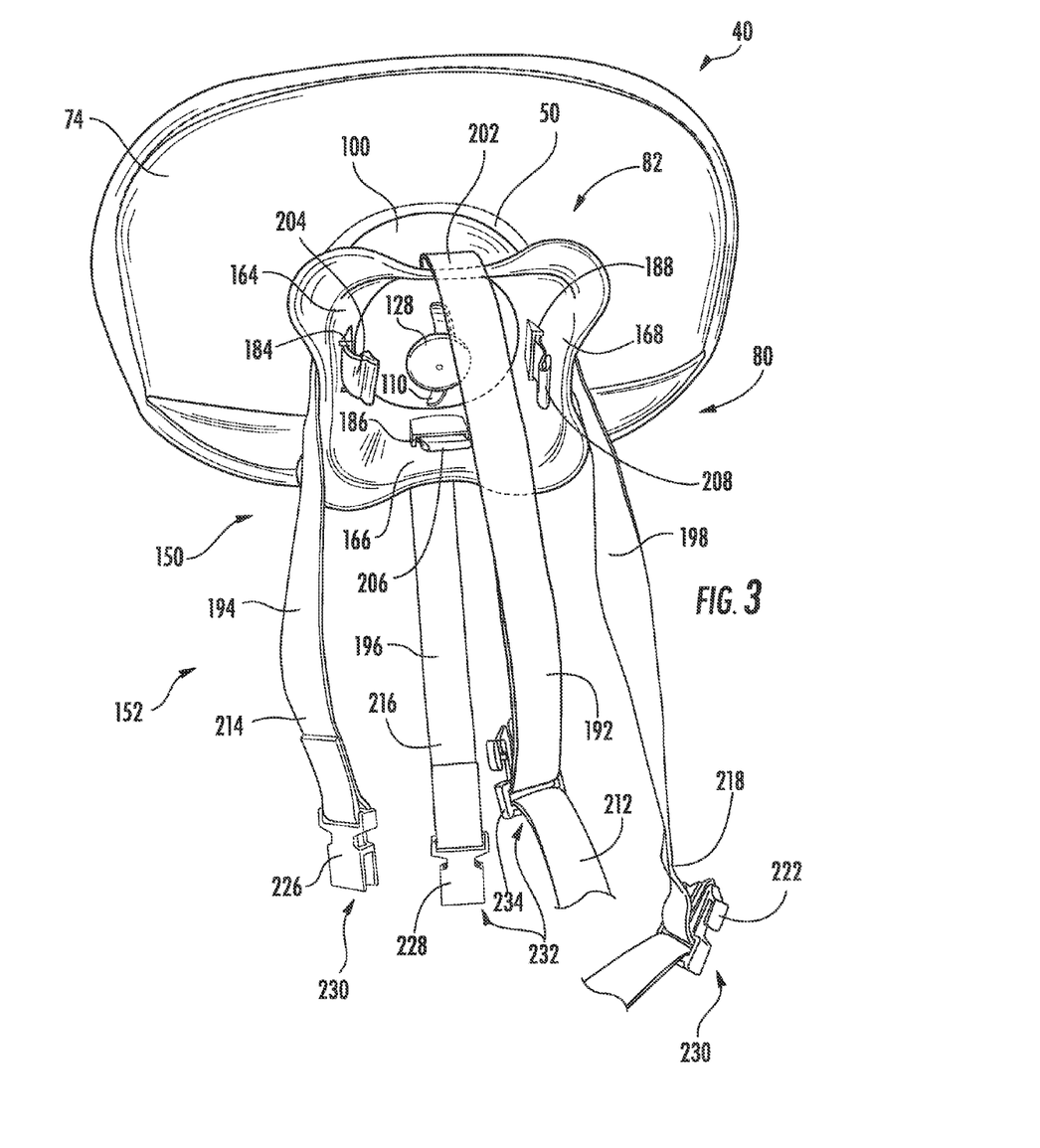
FIG. 3 is a rear view of the mirror device unattached to the headrest, but with attachment straps visible.
Figure 4:
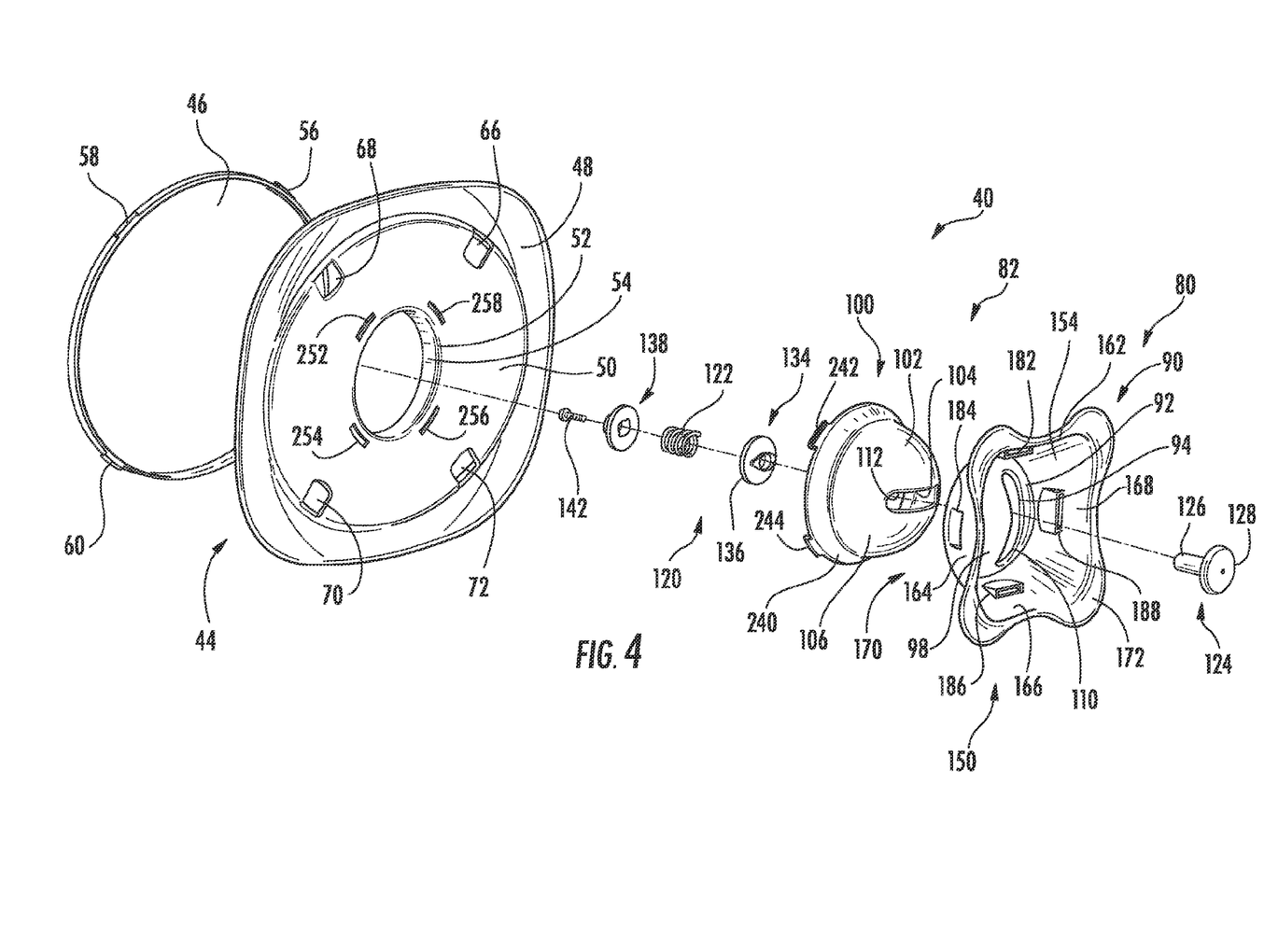
FIG. 4 is an exploded three-dimensional view of the mirror device, generally from the rear, but with the fabric cover of FIGS. 1-3 omitted.
Figure 5:
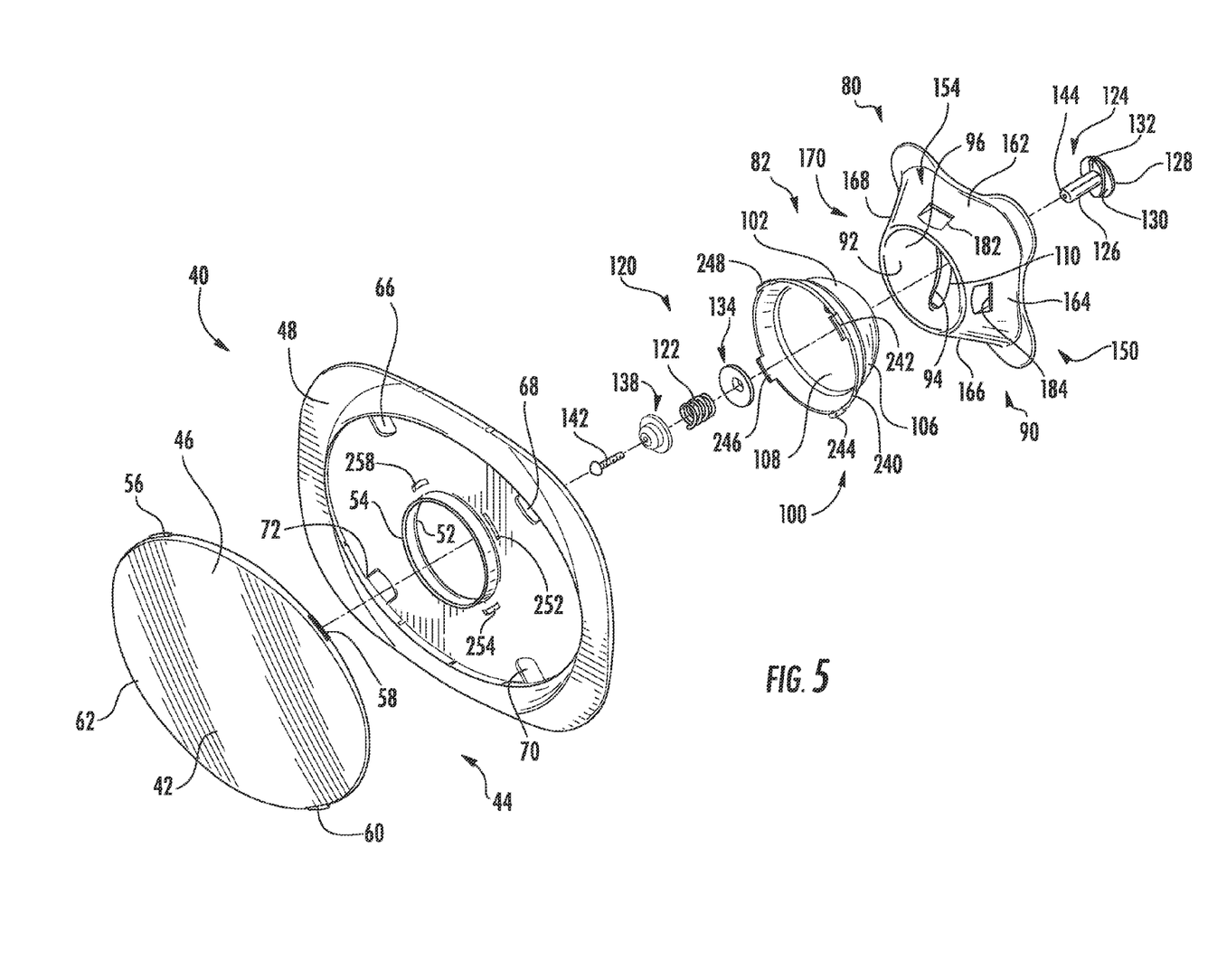
FIG. 5 is an exploded three-dimensional view of the mirror device, generally from the front, likewise with the fabric cover of FIGS. 1-3 omitted.
Figure 6:
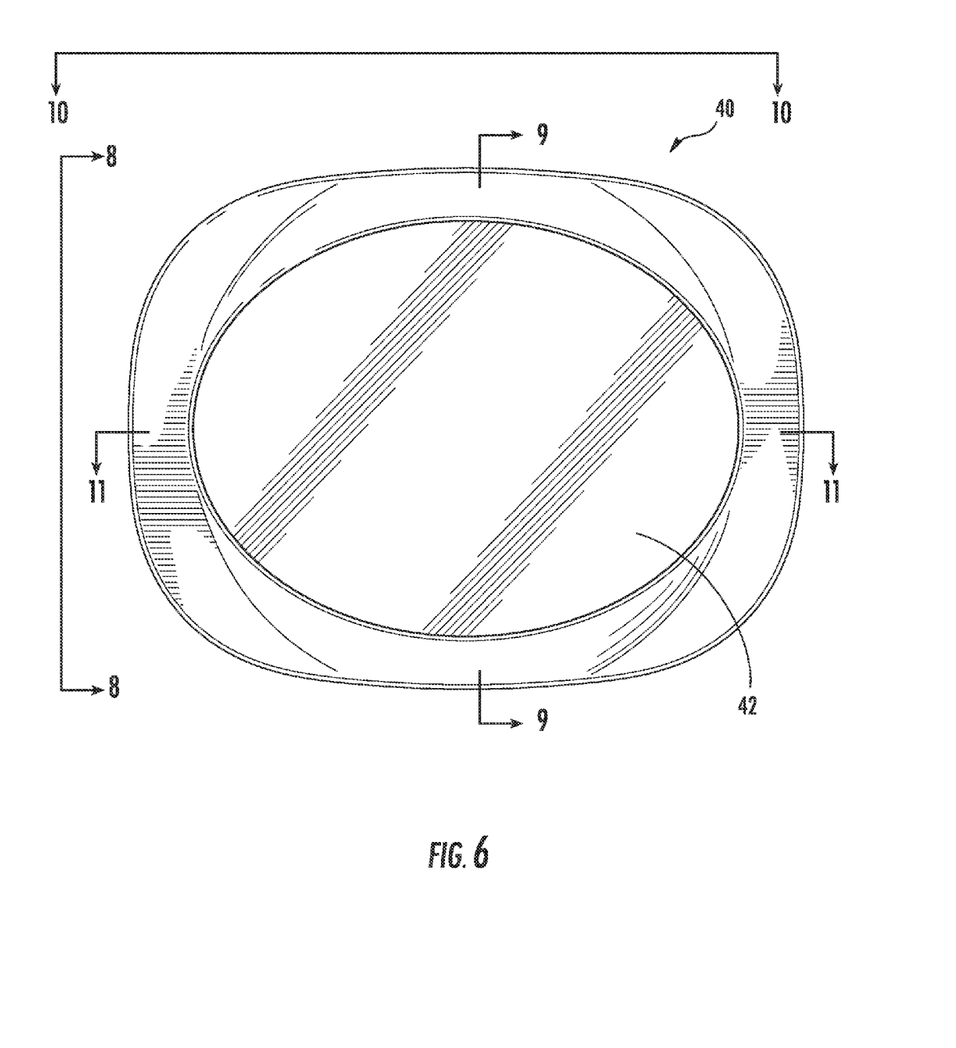
FIG. 6 is a front elevational view of the mirror device, but with the fabric cover omitted.
Figure 7:
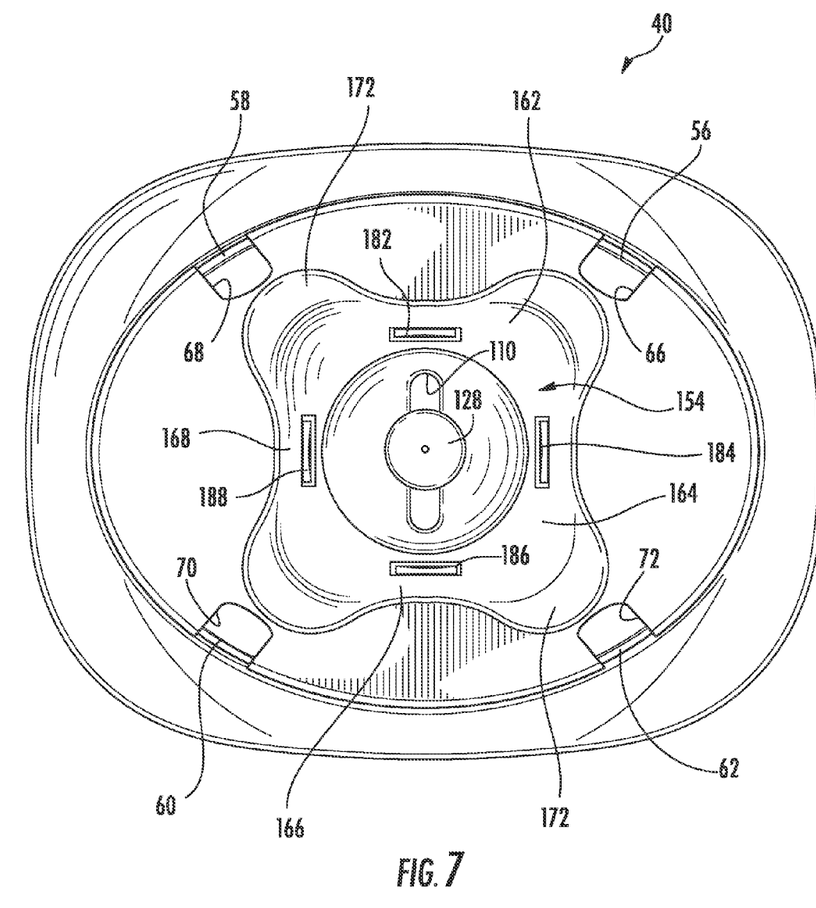
FIG. 7 is a rear elevational view of the mirror device, with the fabric cover and attachment straps omitted.
Figure 8:
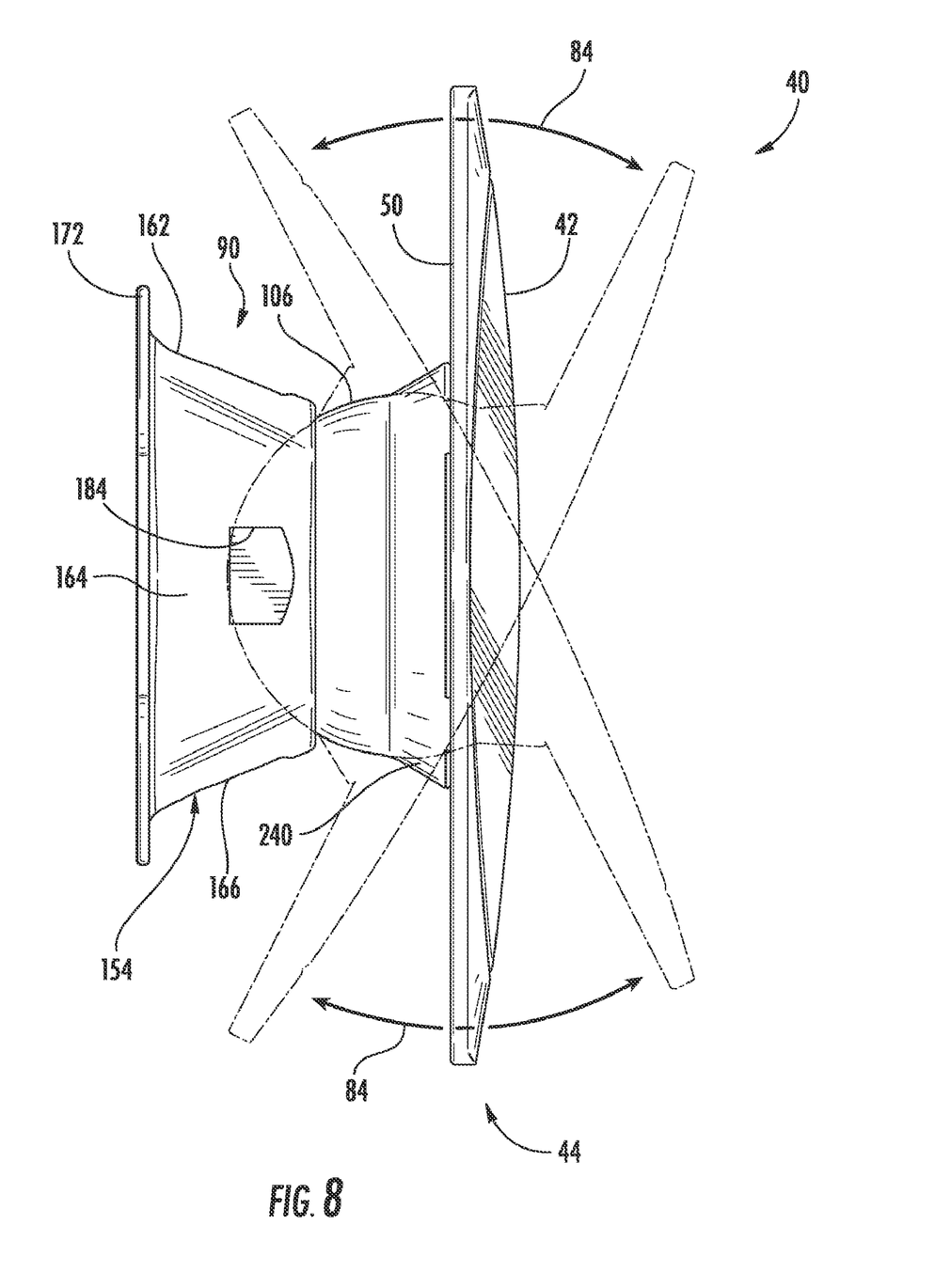
FIG. 8 is a side elevational view, taken from the left side of FIG. 6, illustrating an "up" and "down" range of adjustment.
Figure 9:
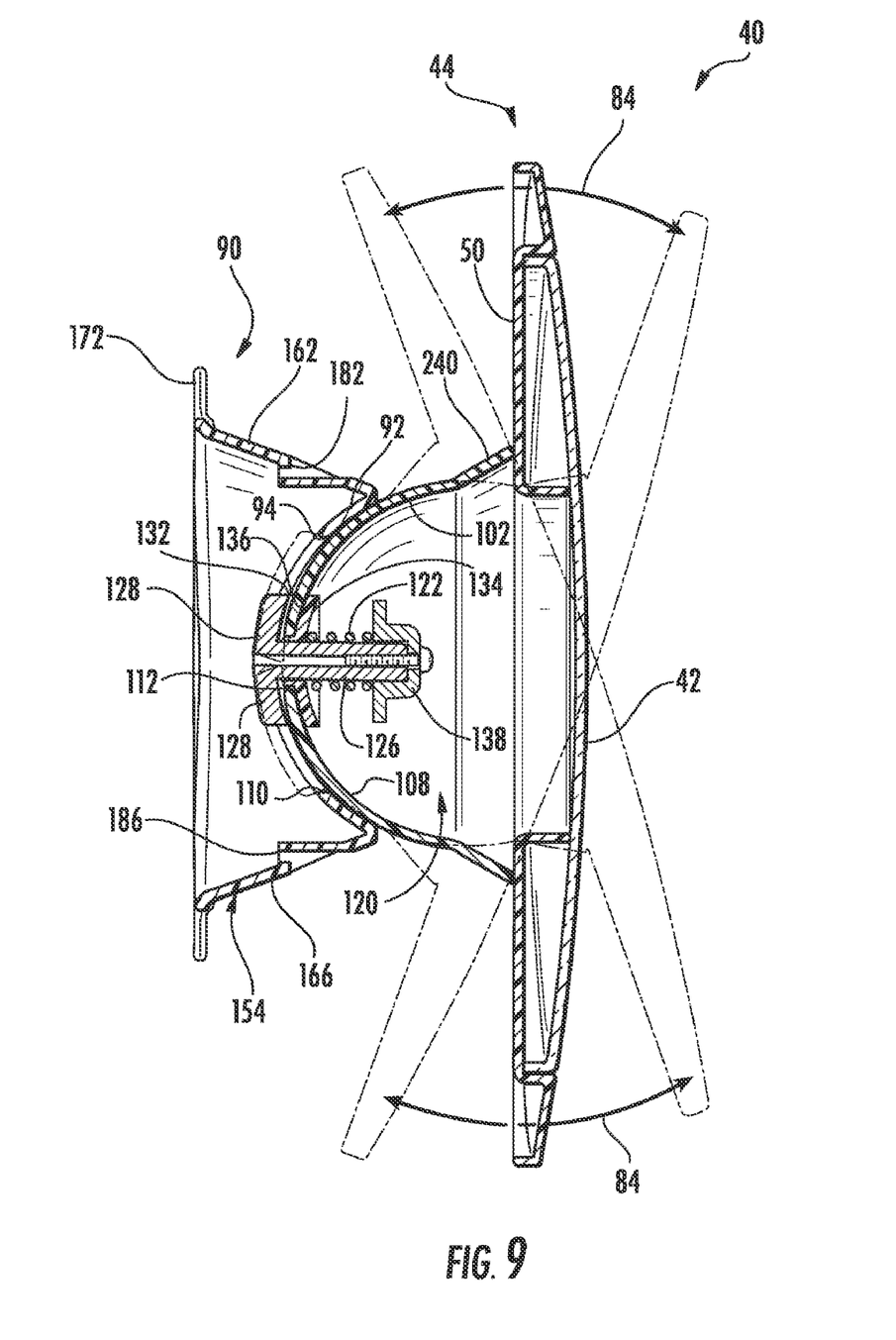
FIG. 9 is a cross-sectional view taken on line 9-9 of FIG. 6, also illustrating the "up" and "down" range of adjustment.

The mirror 46 can be attached to the mirror frame 48 in a variety of ways. In the illustrated embodiment, and as best seen in FIGS. 4 and 5, tabs 56, 58, 60 and 62 on the periphery of the mirror 46 engage corresponding cutouts 66, 68, 70 and 72 in the mirror frame 48. A fabric cover 74 surrounds the mirror 46 and frame 48, leaving most of the front reflective surface 42 exposed, as well as a portion of the rear surface 50 immediately surrounding the central aperture 52. The fabric cover 74 is shown in FIGS. 1-3, but is omitted from the remaining drawing figures for clarity of illustration.

Figure 10:
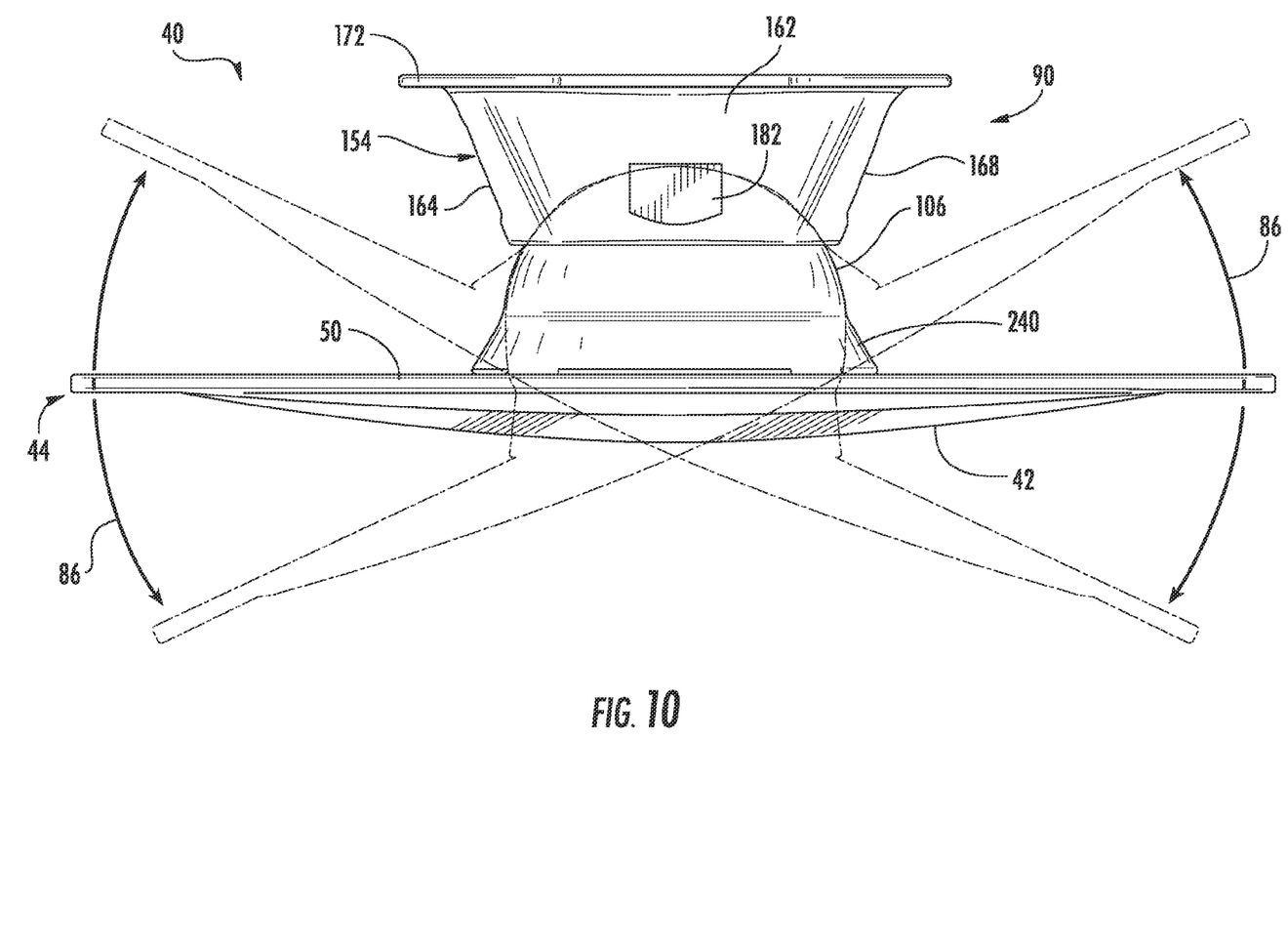
FIG. 10 is a top plan view taken on line 10-10 of FIG. 6, also illustrating a "left" to "right" range of adjustment.
Figure 11:
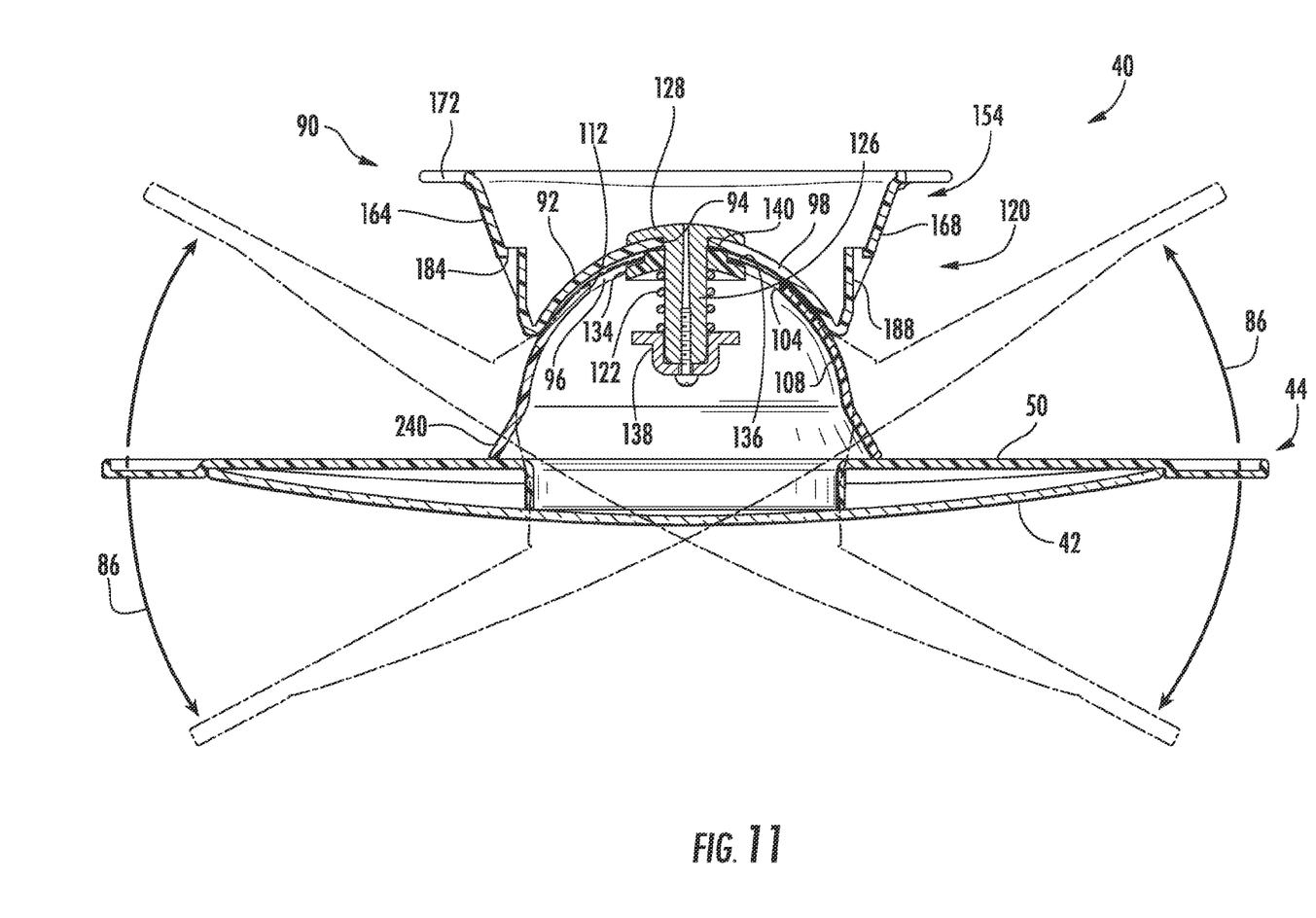
FIG. 11 is a cross-sectional view taken on line 11-11 of FIG. 6, also illustrating the "left" to "right" range of adjustment.

The mirror device 40 additionally includes an attachment, generally designated 80, for attaching the mirror device 40 to the headrest 28. The attachment 80 includes a swivel device generally designated 82, related to but of different construction compared to a conventional ball-and-socket joint. The swivel device 82 provides a wide range of adjustment, allowing the mirror 46 to be tilted up and down generally on a horizontal axis as indicated by arrows 84 (FIGS. 8 and 9), as well as from side to side generally on a vertical axis as indicated by arrows 86 (FIGS. 10 and 11). A parent is accordingly afforded flexibility in attaching the mirror device 40 either to side or to center headrests, while being able to find an adjustment position which permits viewing of the infant 38 in the mirror 46.

The swivel device 82 more particularly includes a concavity element 90 in turn including a first bowl-like structure 92 having a concavity element bowl thickness 94. The first bowl-like structure 92 has a concave working surface 96, which geometrically is a partial hollow sphere and has an extent which is less than one-half of a sphere. The first bowl-like structure 92 has a concavity element opposite surface 98 (which is convex) separated from the concave working surface 96 by the concavity element bowl thickness 94.

The swivel device 82 additionally includes a corresponding convexity element 100 in turn including a second bowl-like structure 102 having a convexity element bowl thickness 104. The second bowl-like structure 102 has a convex working surface 106, which geometrically is a portion of a sphere. The convex working surface 106 is configured to at least partially frictionally engage the concave working surface 96, and does so when assembled. The second bowl-like structure has a convexity element opposite surface 108 (which is concave) separated from the convex working surface 106 by the convexity element bowl thickness 104.

When assembled, the convex working surface 106 of the convexity element 100 is received within the concave surface 96 of the concavity element 90, and the concavity and convexity elements 90 and 100 are secured to each other in a manner which freely permits relative rotation over a useful angle in both up-and-down (FIGS. 8 and 9) and side-to-side (FIGS. 10 and 11) swivel movements for manual adjustment purposes, with frictional force maintaining a desired adjusted position.

More particularly, the first and second bowl-like structures 92 and 102 have respective slotted apertures 110 and 112 in the respective bowl thicknesses 94 and 104. The apertures 110 and 112, being slotted, accordingly each have a length and a width and are oriented at an angle with reference to each other. In the illustrated embodiment, the slotted aperture 110 in the first bowl-like structure 92 is vertical, and the slotted aperture 112 in the second bowl-like structure 102 is horizontal. It will be appreciated that the actual orientations of the slotted apertures 110 and 112 are immaterial; what is important is that they are oriented generally at an angle with reference to each other. For best functionality it is preferred that the slotted apertures 110 and 112 be oriented at a right angle with reference to each other.

To secure the concavity and convexity elements 90 and 100 to each other, and to urge or bias the concave and convex working surfaces 96 and 106 towards each other with sufficient force such that said concavity and convexity elements 90 and 100 are frictionally maintained in a desired adjusted position with reference to each other, while at the same time permitting manual adjustment, a biasing fastener generally designated 120 and including a spring 122 is provided.

The biasing fastener 120 additionally includes a pin 124 having a cylindrical shaft 126 and a head 128. The shaft 126 passes through both slotted apertures 110 and 112, while the head 128 engages the concavity element 90 opposite surface 98. As shown in FIG. 5, the head 128 has a concave working surface 130 which bears against the surface 98, and has an elongated embossment 132 which engages the slotted aperture 110 to prevent rotation of the pin 124.

The spring 122 is a compression spring and is captured between an intermediate washer 134 having a convex working surface 136 (FIG. 4) and a flanged end cap 138. The convex working surface 136 bears against the convexity element 100 opposite surface 108 and has an elongated embossment 140 which engages the slotted aperture 112. A screw 142 (FIG. 4) is threaded into a hole 144 (FIG. 5) in the pin 124 to retain the end cap 138, while compressing the spring 122.

One of the concavity and convexity elements 90 and 100 is connected and secured to the rear surface 50 of the mirror and backing assembly 44, and the other of the concavity and convexity elements 90 and 100 includes a sub-attachment 150 for connection to the headrest 28.

In the illustrated embodiment, the concavity element 90 includes the sub-attachment 150, which in turn includes a strap assembly 152 (FIGS. 2 and 3). More particularly, the concavity element 90 includes a base 154 having four sidewalls 162, 164, 166 and 168 integral with the first bowl-like structure 92 to define a generally closed end 170, and an integral flange 172 opposite the generally closed end 170. During use, the flange 172 is held firmly against the headrest 28 by the strap assembly 152 (FIG. 2). The sidewalls 162, 164, 166 and 168 have respective apertured strap end retainers 182, 184, 186 and 188, and the strap assembly 152 (FIGS. 2 and 3) includes four straps 192, 194, 196 and 198 having proximal ends 202, 204, 206 and 208 retained by the apertured strap end retainers 182, 184, 186 and 188, respectively. The straps 192, 194, 196 and 198 have distal ends 212, 214, 216 and 218 with attached tongue elements 222 and 234 and receiver elements 226 and 228 of a pair of side release buckles 230 and 232.

The convexity element 100, in the illustrated embodiment is connected and secured to the rear surface 50 of the mirror and backing assembly 44, and includes an annular mounting flange 240 integral with the open end of the second bowl-like structure 102. The annular mounting flange 240 has a set of four mounting tabs 242, 244, 246 and 248 which snap into corresponding slots 252, 254, 256 and 258 in the mirror frame 48 immediately adjacent and surrounding the central aperture 52 and collar 54.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A mirror device for use inside a vehicle including a front seating area, a rear seating area, and a rear seat within the rear seating area, the rear seat having an upwardly-extending headrest, said mirror device comprising:
   a mirror and backing assembly including a rear surface;
   an attachment connected to said rear surface for attaching said mirror device to the headrest, said attachment in turn comprising a swivel device including
      a concavity element including a first bowl-like structure having a concave working surface, and a concavity element opposite surface separated from said concave working surface by a concavity element bowl thickness,
      a convexity element including a second bowl-like structure having a convex working surface configured to and at least partially frictionally engaging said concave working surface, and a convexity element opposite surface separated from said convex working surface by a convexity element bowl thickness,
      said first and second bowl-like structures having respective slotted apertures oriented at an angle with reference to each other, and
      a biasing fastener extending through said slotted apertures to secure the concavity and convexity elements to each other and to bias said concave and convex working surfaces towards each other with sufficient force such that said concavity and convexity elements are frictionally maintained in a desired adjusted position with reference to each other, while at the same time permitting manual adjustment,
      one of said concavity and convexity elements being connected to said rear surface of said mirror and backing assembly, and the other of said concavity and convexity elements including a sub-attachment for connection to the headrest.

2. The mirror device of claim 1, wherein said sub-attachment comprises a strap assembly.

3. The mirror device of claim 1, wherein said convexity element is connected to said rear surface of said mirror, and said concavity element includes said sub-attachment.

4. The mirror device of claim 3, wherein said sub-attachment comprises a strap assembly.

5. A mirror device for use inside a vehicle, said mirror device comprising:
   a mirror and backing assembly including a rear surface;
   an attachment connected to said rear surface for attaching said mirror device to a portion of the vehicle, said attachment in turn comprising a swivel device including
      a concavity element including a first bowl-like structure having a concave working surface, and a concavity element opposite surface separated from said concave working surface by a concavity element bowl thickness,
      a convexity element including a second bowl-like structure having a convex working surface configured to and at least partially frictionally engaging said concave working surface, and a convexity element opposite surface separated from said convex working surface by a convexity element bowl thickness,
      said first and second bowl-like structures having respective slotted apertures oriented at an angle with reference to each other, and
      a biasing fastener extending through said slotted apertures to secure the concavity and convexity elements to each other and to bias said concave and convex working surfaces towards each other with sufficient force such that said concavity and convexity elements are frictionally maintained in a desired adjusted position with reference to each other, while at the same time permitting manual adjustment,
      one of said concavity and convexity elements being connected to said rear surface of said mirror and backing assembly, and the other of said concavity and convexity elements including a sub-attachment for connection to the vehicle.

6. The mirror device of claim 5, wherein said sub-attachment comprises a strap assembly.

7. The mirror device of claim 5, wherein said convexity element is connected to said rear surface of said mirror, and said concavity element includes said sub-attachment.

8. The mirror device of claim 7, wherein said sub-attachment comprises a strap assembly.

* * * * *